(12) United States Patent
Mohan

(10) Patent No.: US 8,498,402 B2
(45) Date of Patent: Jul. 30, 2013

(54) CUSTOMER SUPPORT USING MANAGED REAL-TIME COMMUNITIES

(75) Inventor: Prabhuram Mohan, San Jose, CA (US)

(73) Assignee: Aspect Software, Inc., Chelmsford, MA (US)

( * ) Notice: Subject to any disclaimer, the term of this patent is extended or adjusted under 35 U.S.C. 154(b) by 1769 days.

(21) Appl. No.: 11/455,440

(22) Filed: Jun. 19, 2006

(65) Prior Publication Data

US 2007/0291737 A1    Dec. 20, 2007

(51) Int. Cl.
*H04M 3/00* (2006.01)

(52) U.S. Cl.
USPC ............. 379/265.05; 379/265.01; 379/265.02

(58) Field of Classification Search
USPC .......................... 379/265.05, 265.12–265.13
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,732,156 B2 | 5/2004 | Miloslavsky | |
| 6,785,741 B1 * | 8/2004 | Mandalia et al. | ............. 719/328 |
| 7,509,266 B2 * | 3/2009 | Rogers et al. | ................ 705/7.32 |
| 2003/0108185 A1 * | 6/2003 | Brown et al. | ............ 379/266.01 |
| 2005/0286705 A1 * | 12/2005 | Contolini et al. | ........ 379/265.02 |

* cited by examiner

*Primary Examiner* — Rasha Al Aubaidi

(74) *Attorney, Agent, or Firm* — Husch Blackwell LLP

(57) ABSTRACT

A method and apparatus are described for routing a call received by an organization. The method includes the steps of determining a subject matter of the received call, routing the call to an agent of the organization when a agent of the organization is available to handle the subject matter of the call and routing the call to a client of the organization when an agent of the organization is not available.

28 Claims, 2 Drawing Sheets

CUSTOMER SUPPORT USING MANAGED REAL-TIME COMMUNITIES

FIELD OF THE INVENTION

The field of the invention relates to call centers and more particularly to methods of providing customer support.

BACKGROUND OF THE INVENTION

Customer support is an integral part of many products sold today. In the case of computers and computing systems, such devices are often sold with a wide variety of software and hardware options. Third-party add-ons provide the possibility of an almost infinite array of combinations available on any one computer. Because of the almost infinite array of combinations, many manufacturers only supply a bare minimum of documentation and, instead, rely upon telephone/Internet "help desks" as a means of supporting their customers.

In order to provide support, many organizations distribute one or more telephone numbers or Internet addresses (e.g., e-mail addresses, URLs, etc.) for use in placing calls requesting support. Calls to those destinations are typically received and distributed to agents of the organization by an automatic call distributor (ACD).

While the distribution of calls to agents is effective, the quality of support is often uneven. While some agents may be very well trained in the subject matter of a call, other agents may have very little knowledge.

As a consequence, a customer may be routed to a first agent who may ask questions and offer a few suggestions. The customer may follow the suggestions and if the suggested steps succeed, the customer may hang up feeling satisfied.

On the other hand, where the initial suggestions do not succeed, the agent may need to identify and transfer the call to a more experienced agent. If a more experienced agent is available, then the agent may offer more suggestions or ask the customer to repeat the previous steps. If a more experienced agent is busy, or otherwise not available, then the customer may be asked to await a return call. This process may be repeated any of a number of times until a solution is found.

In the mean time, the customer may experience a growing sense of frustration in the level of support that he/she is receiving. If the problem is critical to the business of the customer, the delays may result in economic hardship and loss of business to both the customer and to the organization providing the customer support. Because of the importance of customer support, a need exists for better methods for providing customer support.

SUMMARY

A method and apparatus are described for routing a call received by an organization. The method includes the steps of determining a subject matter of the received call, routing the call to an agent of the organization when a agent of the organization is available to handle the subject matter of the call and routing the call to a client of the organization when an agent of the organization is not available.

DETAILED DESCRIPTION OF AN ILLUSTRATED EMBODIMENT

Disclosed herein is a system in which a first set of clients of an organization are used by the organization in support of the technical needs of another, second set of clients. Such system can have great value when some clients have extensive experience with a product of the organization yet other clients have very little experience.

The concept of using the more experienced clients (expert clients) to support the needs of the less experienced clients (requesting clients) benefits both the organization and supporting clients on any of a number of different levels. On a first level, the organization may not need as many agents in support of product use. This tends to reduce an overall product cost of the organization.

On another level, the concept makes better use of the overall knowledge base in the use of a product. For example, when the technical agents of the organization are overloaded, the concept allows the organization to route calls to expert clients rather than forcing the less experienced clients to wait for support. As used herein, routing a call to a client of an organization does not mean routing the call to a subsidiary or affiliate of the organization or to employees of the organization at another location. It also doesn't mean routing the call to a service organization paid by the organization to handle all or a portion of the calls or overflow calls.

The provision of support to other less experienced clients also helps better utilize the technical personnel of expert clients who have already developed a knowledge base in the product. The support may also be used as the basis of a charge-back or for receiving other consideration from the organization.

Alternatively, the support may be offered on a less formal basis. For example, the organization may track the support provided by expert clients and compensate the expert client by such means as frequent flyer miles.

In general, the concept of one client helping another client is somewhat similar to user groups operating on the Internet. However, the concepts described herein (of client helping client) are different because Internet user groups are not managed, there is no mechanism for qualifying experts and there is no real-time component to a response from an Internet user group. In the current Internet environment, very few people would accept technical help from someone that they did not personally know (e.g., a member of a chat group) without a great deal of trepidation. In general, the concepts described herein revolves around client user groups who are managed, who are clients of the organization, who qualify as experts and who can respond in real time or near real time.

Figure 1:
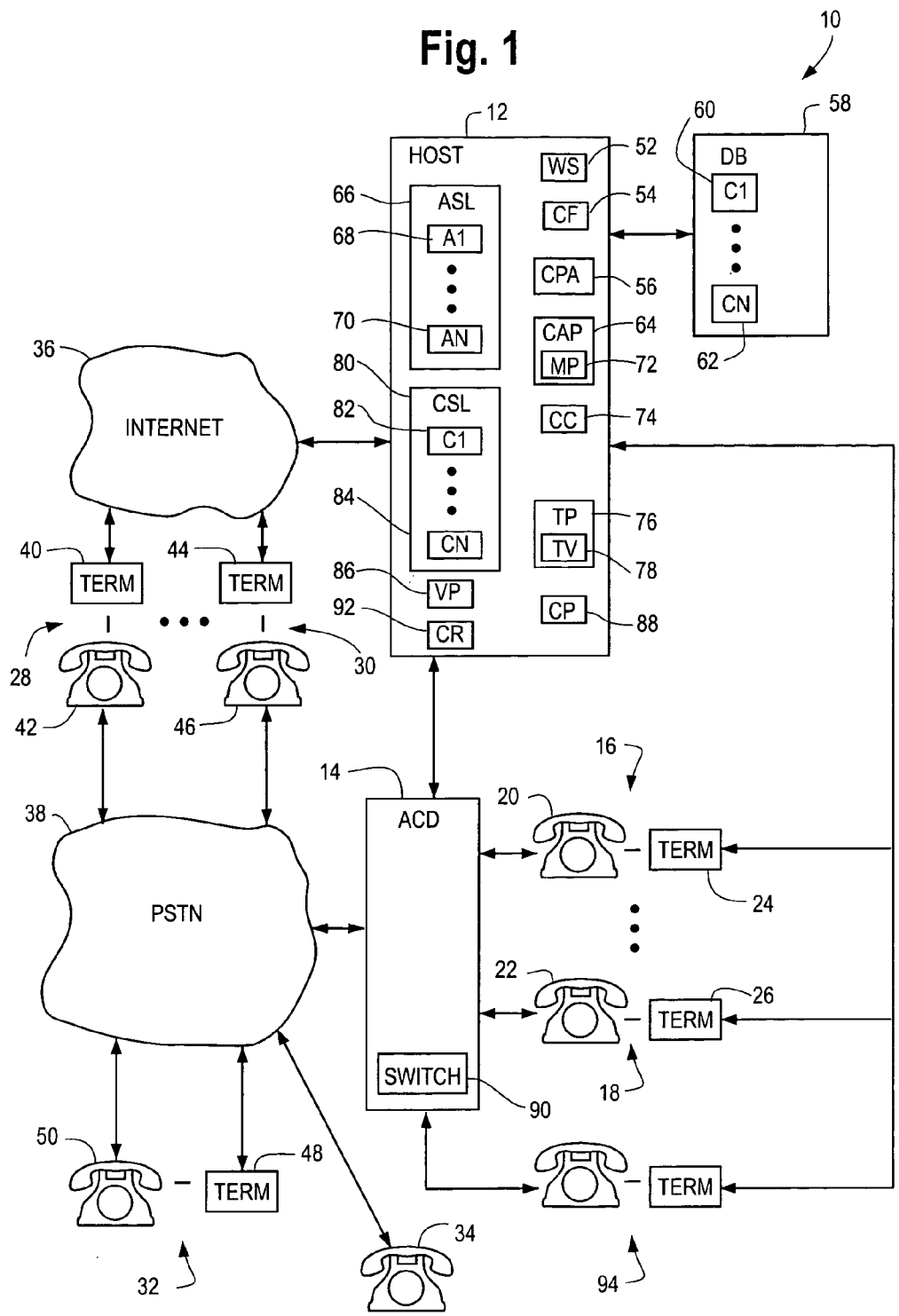
FIG. 1 is a block diagram of a call routing system in accordance with an illustrated embodiment of the invention.

FIG. 1 is a block diagram of a communication system 10 used by an organization to route calls of clients shown generally in accordance with an illustrated embodiment of the invention. Included within the system 10 may be a host 12 and an automatic call distributor 14. The system 10 may also include a number of agent stations 16, 18.

Each agent station 16,18 may include a telephone 20, 22 and a terminal 24, 26. The telephones 20, 22 of the agents 16, 18 may be used to place and receive calls with clients 28, 30, 32, 34 through the ACD 14 and PSTN 38. Similarly, the terminals 24, 26 of the agents 16, 18 may be used to retrieve information from the host 12 and to exchange packet based calls with clients 28, 30, 32, 34 through the host 12 and Internet 36.

In general, calls may arrive at the system 10 under any of a number of different formats. Under a first format, clients 28, 30, 32, 34 may place calls under a switched circuit format from a telephone 34, 42, 46, 48 of the client to the system 10. Alternatively, clients 30, 32, 34 may place calls under a packet format (e.g., VoIP, e-mail, instant message, etc.) from a terminal 40, 44, 50 of the client 28, 30, 32, 34 to the system 10.

In order to communicate with its clients, the organization may promulgate (by advertising or otherwise) contact information (identifiers) of the organization under any of a number of different formats (e.g., URLs of websites, e-mail addresses, telephone numbers, etc.). The use of multiple communication identifiers may provide an indicator of a subject matter of a call. For example, in the case where the organization is a bank, a first telephone numbers may be provided for a loan department, a second may be for new accounts and a third telephone number may be for account balances.

Similarly, a number of websites 52 may be provided for different products in the case where the organization is a merchant selling a number of different products. As a client 28, 30, 32, 34 accesses a website and views web pages, at least some of the web pages may include a CONNECT WITH ONE OF OUR AGENTS softkey that offers contact with one of the organization's agents 16, 18. Activation of the CONNECT WITH ONE OF OUR AGENTS softkey may result in the set up of a call between a client 28, 30, 32, 34 and an agent 16, 18 of the organization. The connection may be formed under any of a number of real time formats (e.g., VoIP, instant messaging, etc.) or non-real time formats (e.g., e-mail).

As calls are received by the system 10, a call processing application (call processor) 56 within the host 12 of the system 10 may open a call file 54 for each call. Within the call file, the call processing application 56 may save call associated information. In the case of calls received from the PSTN 38 by the ACD 14, the call associated information may include ANI and DNIS information.

In the case of call received through the Internet, the call associated information may include a URL of a source of the call and an identifier of any web pages visited if the call originated from the website 52. In the case of Internet messages, the content of the message may also be saved to the call file 54.

Once the call file 54 has been created, the call processor 56 may attempt to classify the call. Classification may be based upon the identity of the caller and upon the subject matter of the call.

The identity of the caller may be determined from a source identifier of the call. In the case of a message through the Internet, the URL of the packet may be used as a source identifier. In the case of calls through the PSTN, the identity of the caller may be determined from ANI information delivered along with the call.

The subject matter of the call (on a first level) may be determined from a packet destination address for messages through the Internet or an identifier of any web pages visited if the call came from the website 52. In the case of calls through the PSTN 38, the subject matter of the call can be determined from the number dialed (as determined from DNIS information delivered along with the call).

Classification of the call may be further enhanced by determining if the current call is a first contact with the caller of if the caller has called before. Determination of where the call is from a new contact may be made by comparing the source identifier of the call with source identifiers within client files 60, 62 within a client database 58. If a match within the client database 58 is found, then the subject matter of past calls (as determined from client files 60, 62) can be used as a further indicator of the subject matter of a present call.

Once a call has been classified, the call may be transferred to a call assignment processor 64. Within the call assignment processor 64, the identity and subject matter of the call may be used to select an agent 16, 18 to handle the call.

Selection of an agent 16, 18 to handle a call may be accomplished by comparison of the subject matter of a call with the contents of a skills list 68, 70 of each available agent 16, 18. In this regard, a matching processor 72 within the call processing application 64 may compare a subject matter of the call with a skills list of each agent 16, 18. Once a closest match has been found, the call assignment processor 64 may select that agent 16, 18 and assign (transfer) the call to the selected agent 16, 18.

In the case where the call is received through the PSTN 38 by the ACD 14, transfer may include the call assignment processor 64 transferring instructions to the ACD 14 to transfer the call to a telephone console 20, 22 of the selected agent. In the case of an Internet call, the call assignment processor 64 may transfer the entire call file 54 to the selected agent 16, 18.

Upon occasion, an agent 16, 18 with the requisite skills may not be available within the system 10. When this situation exists, the call may be placed in a call queue 74. When an agent with a certain minimum level of skill in the subject matter of the call becomes available, the call may be assigned to that agent.

During the time that a call remains in the queue 74, a timing processor 76 monitors that accumulated time. When the accumulated time exceeds a threshold value 78, the timing processor 76 sends a message to the call assignment processor 64 notifying the call assignment processor 64 that the time in queue of the call has exceed the threshold 78.

Where the time in queue exceeds a threshold, the call assignment processor 64 may consider assigning the call to an expert client of the organization. In order to facilitate the use of an expert client 82, 84, the call assignment processor 64 may first couple a client prompting processor 88 to the call that asks permission before the client 28, 30, 32, 34 is transferred to an expert client 82, 84. If the client 28, 30, 32, 34 answers in the affirmative, then the call is transferred to an expert client 82, 84.

In order to assign the call to a client, the call assignment processor 64 may first identify a client qualified to handle the call. In this regard, clients may be qualified as experts based upon a skill level.

In order to evaluate the skill level of clients, a client skills list 80 may be provided within a memory of the host 12. Included within the list 80 may be one or more files 82, 84 containing a list of skills of each client 28, 30, 32, 34.

For simplicity, reference number 82 and 84 will hereinafter also be used to refer to the expert client. It should also be noted that expert clients 82, 84 may be clients 28, 30, 32, 34 or employees of clients 28, 30, 32, 34.

It should be noted in this regard that the term "expert client" may refer different things in different context. In the case of a sole proprietorship, the term "expert client" may refer to the owner of the sole proprietorship. In contrast, wherein the owner is a corporation, the term "expert client" refers to the employees of the corporation even though from a business standpoint, the corporation would, in fact, be the client of the organization.

In this regard, the matching processor 72 may search the agent skills list 80 for an expert client 82, 84 with skills that match the subject matter of the call. Towards this end, the matching processor 72 may form an ordered list of expert clients 82, 84. An ordered list may be used because, (unlike agents 16, 18) the expert clients 82, 84 have other jobs and may not be available during any particular instant to answer a call.

Figure 2:
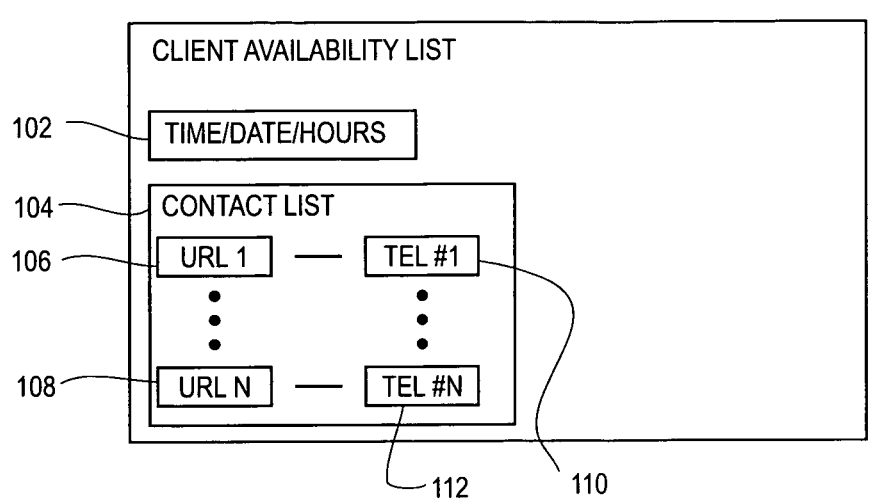
FIG. 2 depicts a client availability list that may be used by the system of FIG. 1.

In order to facilitate establishing a contact with an expert client, the files 82, 84 may also contain a client availability list (contact list) 100 (FIG. 2). The contact list 100 may include a schedule of each expert client and a list of communication system identifiers of where that expert client may be contacted. The schedule may include a list of dates and hours 102 that define when each expert client 82, 84 is available to receive calls from other clients 28, 30, 32, 34.

As a first step in identifying an expert client 82, 84 for a call, the call assignment processor 64 may start with the first expert client 82, 84 of the ordered list (i.e., the most qualified client 82, 84) and compare the schedule with a current time to determine availability. If the current time is outside the schedule of the expert client 82, 84, then the call assignment processor 64 goes on to the next expert client 82, 84 in the ordered list.

Once the call assignment processor 64 finds an expert client 82, 84 who is currently available, then the call assignment processor 64 may select that expert client 82, 84 and attempt to detect a location of the expert client 82, 84. In order to locate the expert client 82, 84, the call assignment processor 64 may check a contact list 104. Included within the contact list 104 may be one or more URLs of the selected expert client 82, 84. A first URL 106, 108 may be an Internet address of a computer that the expert client 82, 84 uses at work. A second URL 106, 108 may be an Internet address of a computer the expert client 82, 84 uses at home. A third URL 106, 108 may be an Internet address of cellphone that the expert client 82, 84 uses for mobile text messaging.

Associated with at least some of the URLs 106, 108 may be a telephone number 110, 112 associated with the URL 106, 108. In the case of a URL 106, 108 associated with an office, the telephone number may be the selected expert's office telephone. Similarly, another URL may be associated with a home telephone number of the expert 82, 84 or even with a cellphone of the expert 82, 84.

In order to locate the selected expert 82, 84, the call assignment processor 64 may sequentially determine whether any of the URLs 106, 108 are currently in use by the selected expert 82, 84. The call assignment processor 64 may do this by comparing the URLs 106, 108 with the contents of an Internet "Buddies List" to detect an Internet presence of the expert 82, 84.

If the call assignment processor 64 should detect the selected expert's presence on any of the URLs, then the call assignment processor 64 may route the call to the expert client 82, 84 based upon the detected presence. Routing, in this case, will depend upon the type of call involved.

For example, if the call is a switched circuit telephone call, then the call assignment processor 64 may simply route the call to the telephone number associated with the URL. Similarly, if the call is a VoIP or instant message type of call, then the call assignment processor 64 may simply route the call to the URL where the expert client was detected.

In order to ensure that the expert client 82, 84 is willing to take the call, the call assignment processor 64 may send an instant message to the expert client 82, 84 inquiring if the expert client 82, 84 is willing to take the call. If the expert client 82, 84 responds in the affirmative, then call assignment processor 64 may route the call accordingly.

If the call assignment processor 64 cannot locate the expert client 80, 82, via the "Buddy List", then the call assignment processor 64 may route the call based upon the assumption that the expert 82, 84 is willing to take the call. If the call occurs during working hours, then the call may be routed to a work telephone of the expert. If the system 10 detects a telephone presence of the expert 82, 84 via a busy signal, then the call is repeated after a short time delay. Alternatively, the call may be routed to a home or cell telephone of the expert, but only if the schedule 102 indicates a willingness to accept calls on that basis.

In the case of a voice call, the voice prompting processor 86 within the host 12 may play an audio message announcing the purpose of the call and, possibly, the identify of the client seeking help. The expert client may remain on the line to accept the call or signal acceptance by activating an appropriate key on his telephone or computer.

In order to qualify and manage the use of expert clients 82, 84, the system 10 may create a call record 92 of each call involving the use of an expert client 82, 84. If the call is a voice call, then the call record 92 may include an audio recording of the call. If the call is a series of instant messages, then the call record 92 may include a record of those messages.

In order to create the call record 92, the information path of any call from a requesting client to an expert client 82, 84 is routed through the system 10. In the case of a call through the PSTN 38, a call from a requesting client 28, 30, 32, 34 is received on a first port of a switch 90 and connected to the expert client 82, 84 through a second port of the switch. In the case of packet messages, the host 12 functions to forward packets between the requesting client 28, 30, 32, 34 and expert client 82, 84 by readdressing the respective messages.

Calls between clients 28, 30, 32, 34 and expert clients 82, 84 may be monitored by a supervisor working at a supervisors station 94. Monitoring may be performed real time or by reviewing call records 92. Based upon the reviews, the supervisor 92 may change skill levels in the skills list 80, add new clients as expert clients 82, 84 or delete clients not wishing to remain within the experts list 80.

A specific embodiment of method and apparatus for routing calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of routing a call from a client of a plurality of clients of an organization to connect with one of a plurality of agents of the organization wherein the clients are not agents, employees, or affiliates of the organization comprising:

determining a subject matter of the call;

routing the call to an agent of the plurality of agents of the organization when a agent of the organization is available to handle the subject matter of the call;

qualifying another client of the plurality of clients as a qualified client qualified to handle the call based upon the subject matter of the call and a skill level of the qualified client; and automatically assigning and transferring the call to the qualified client of the plurality of clients when an agent of the organization is not available.

2. The method of routing calls as in claim 1 further comprising determining whether a qualified agent is available and asking the client for permission to transfer the call to the qualified client before routing the call to the qualified client.

3. The method of routing calls as in claim 2 wherein the step of determining whether a qualified agent is available further comprises comparing a time in queue with a threshold value, and further comprises sending a message to the qualified client to inquire if the qualified client is willing to take the call.

4. The method of routing calls as in claim 1 further comprising managing the plurality of clients including creating a record of each call involving transfer to another of the plurality of clients.

5. The method of routing calls as in claim 1 wherein the step of qualifying the client further comprises searching an ordered employee skills list of each of a managed group of qualified expert clients selected from the plurality of clients based upon the determined subject matter of the call.

6. The method of routing calls as in claim 5 wherein the step of searching the employee skills list further comprises selecting an employee of the client to receive the call by matching a set of skills of the employee with the subject matter of the call.

7. The method of routing calls as in claim 6 further comprising determining a location of the selected employee.

8. The method of routing calls as in claim 7 wherein the step of determining a location of the employee further comprises detecting at least one of an Internet presence of the selected employee and a telephone presence of the selected employee.

9. The method of routing calls as in claim 6 wherein the step of qualifying another client further comprises comparing the qualified client with a client availability list to determine availability.

10. The method of routing calls as in claim 7 wherein the step of detecting a telephone presence of the selected employee further comprises sending a text message to a telephone of the employee notifying the employee of the call.

11. The method of routing calls as in claim 7 further comprising routing the call to the detected location of the selected employee.

12. An apparatus for routing a call from a client of a plurality of clients of an organization to connect with one of a plurality of agents of the organization wherein the clients are not agents, employees, or affiliates of the organization comprising:
means for determining a subject matter of the call;
means for routing the call to an agent of the plurality of agents of the organization when a agent of the organization is available to handle the subject matter of the call;
means for qualifying another client of the plurality of clients as a qualified client qualified to handle the call based upon the subject matter of the call and a skill level of the qualified client; and
means for assigning and routing the call to the qualified client of the plurality of clients of the organization when a qualified agent of the organization is not available.

13. The apparatus for routing calls as in claim 12 further comprising means for determining whether a qualified agent is available and asking the client for permission to transfer the call to the qualified client before routing the call to the qualified client.

14. The apparatus for routing calls as in claim 12 wherein the means for determining that a qualified agent is not available further comprises means for comparing a time in queue with a threshold value.

15. The apparatus for routing calls as in claim 12 wherein the means for routing the call to the qualified client further comprises means for creating a record of each call involving routing to another client.

16. The apparatus for routing calls as in claim 12 wherein the means for qualifying another client further comprises means for searching an employee skills list of each of the plurality of clients based upon the determined subject matter of the call.

17. The apparatus for routing calls as in claim 16 wherein the means for searching the employee skills list further comprises means for selecting an employee of the client to receive the call by matching a set of skills of the employee with the subject matter of the call.

18. The apparatus for routing calls as in claim 17 further comprising means for determining a location of the selected employee.

19. The apparatus for routing calls as in claim 18 wherein the means for determining a location of the employee further comprises means for detecting an Internet presence of the selected employee.

20. The apparatus for routing calls as in claim 18 wherein the means for determining a location of the employee further comprises means for detecting a telephone presence of the selected employee.

21. The apparatus for routing calls as in claim 18 wherein the means for detecting a telephone presence of the selected employee further comprises means for sending a text message to a telephone of the employee notifying the employee of the call.

22. The apparatus for routing calls as in claim 18 further comprising means for routing the call to the detected location of the selected employee.

23. An apparatus for routing a call from a client of a plurality of clients of an organization to connect with one of a plurality of agents of the organization wherein the clients are not agents, employees, or affiliates of the organization comprising:
a call processor that determines a subject matter of the call;
a call assignment processor that routes the call to an agent of the organization when a qualified agent of the organization is available to handle the call, that qualifies another client of the plurality of clients as a qualified client qualified to handle the call based upon the subject matter of the call and a skill level of the qualified client, and that assigns and transfers the call to the qualified client of the plurality of clients of the organization when a qualified agent of the organization is not available.

24. The apparatus for routing calls as in claim 23 further comprising a timing processor that determines that an agent is not available when a time value exceeds a threshold value.

25. The apparatus for routing calls as in claim 23 further comprising a client skills list that identifies clients qualified to service the call from the plurality of clients of the organization.

26. The apparatus for routing calls as in claim 25 further comprising a matching processor that searches an employee skills list of at least some of the plurality of clients based upon the determined subject matter of the call, and selects a selected employee as the qualified client.

27. The apparatus for routing calls as in claim 26 further comprising a client availability list that determines a location of the selected employee.

28. The apparatus for routing calls as in claim 27 further comprising a text message that is sent to a telephone of the selected employee notifying the selected employee of the call.

* * * * *